(12) United States Patent
Yeh

(10) Patent No.: US 9,201,495 B2
(45) Date of Patent: Dec. 1, 2015

(54) CONTROL OF PERSPECTIVE IN MULTI-DIMENSIONAL MEDIA

(75) Inventor: James Yeh, Berkeley, CA (US)

(73) Assignee: MobiTV, Inc., Emeryville, CA (US)

( * ) Notice: Subject to any disclaimer, the term of this patent is extended or adjusted under 35 U.S.C. 154(b) by 625 days.

(21) Appl. No.: 13/454,332

(22) Filed: Apr. 24, 2012

(65) Prior Publication Data

US 2013/0278732 A1 Oct. 24, 2013

(51) Int. Cl.
*H04N 13/04* (2006.01)
*H04N 15/00* (2006.01)
*G06F 3/01* (2006.01)
*G09G 3/00* (2006.01)
*G09G 5/00* (2006.01)

(52) U.S. Cl.
CPC .............. *G06F 3/01* (2013.01); *H04N 13/0497* (2013.01); *G09G 3/003* (2013.01); *G09G 5/00* (2013.01); *G09G 2320/0261* (2013.01); *H04N 13/045* (2013.01); *H04N 13/0468* (2013.01)

(58) Field of Classification Search
CPC ............ H04N 19/00769; H04N 7/181; H04N 21/2365; H04N 21/41407; H04N 21/6587; H04N 7/185; H04N 13/0282; G06T 17/00; G06F 3/0484; G06F 3/04842; G06F 3/011
USPC ......................................... 348/42–60, 36–39
See application file for complete search history.

(56) References Cited

U.S. PATENT DOCUMENTS

| | | | |
|---|---|---|---|
| 2004/0196259 A1* | 10/2004 | Bradski | 345/158 |
| 2007/0019000 A1* | 1/2007 | Motomura et al. | 345/619 |
| 2007/0200927 A1* | 8/2007 | Krenik | 348/47 |
| 2007/0263003 A1* | 11/2007 | Ko et al. | 345/502 |
| 2008/0276178 A1* | 11/2008 | Fadell et al. | 715/733 |
| 2009/0207234 A1* | 8/2009 | Chen et al. | 348/14.09 |
| 2010/0053322 A1* | 3/2010 | Marti et al. | 348/135 |
| 2010/0131585 A1* | 5/2010 | Rodrigue et al. | 709/203 |
| 2010/0171691 A1* | 7/2010 | Cook et al. | 345/156 |
| 2011/0157327 A1* | 6/2011 | Seshadri et al. | 348/51 |
| 2011/0298919 A1* | 12/2011 | Maglaque | 348/143 |

* cited by examiner

*Primary Examiner* — Andy Rao
*Assistant Examiner* — Jared Walker
(74) *Attorney, Agent, or Firm* — Kwan & Olynick LLP

(57) ABSTRACT

Media bit streams are encoded in a multi-dimensional manner so that a user can have multiple perspectives of a particular scene or portrayal. In some examples, different bit streams depicting the same scene from slightly different perspectives, angles, or vantage points are presented depending on user control. The experience of the user can change depending on the perspective of the media stream presented. A device sensor, such as an accelerometer, compass, gyroscope, camera, etc., can be used to control which multi-dimensional bit streams are displayed to a particular user. Devices may include mobile devices, remote controls, tablets, etc. A user can pan or move around a scene or object presented in an intuitive and non-imposing manner.

20 Claims, 6 Drawing Sheets

CONTROL OF PERSPECTIVE IN MULTI-DIMENSIONAL MEDIA

TECHNICAL FIELD

The present disclosure relates to control of perspective in multi-dimensional media.

DESCRIPTION OF RELATED ART

Three-dimensional video simultaneously presents two bit streams from slightly different perspectives. Each bit stream corresponds to the view for a particular eye. It is contemplated that multi-dimensional video will include numerous bit streams from different perspectives. Each bit stream would correspond to the view from a particular perspective or vantage point.

However, mechanisms for controlling multi-dimensional perspectives are limited. Consequently, it is desirable to provide improved mechanisms for controlling multi-dimensional perspectives.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
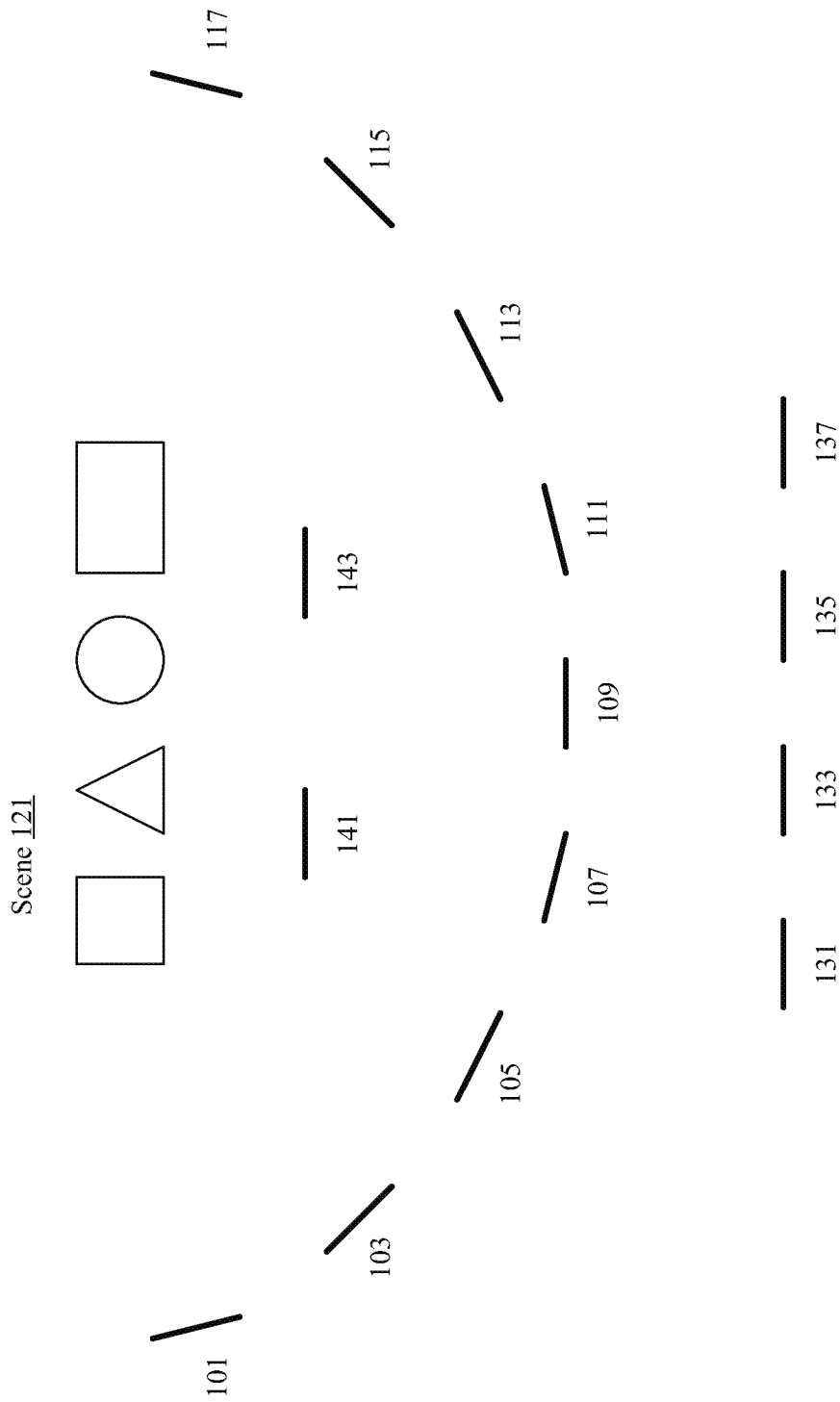
FIG. 1 illustrates one example of a multi-dimensional media system.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular media streams. However, it should be noted that the techniques of the present invention apply to a wide variety of different media streams. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Media bit streams are encoded in a multi-dimensional manner so that a user can have multiple perspectives of a particular scene or portrayal. In some examples, different bit streams depicting the same scene from slightly different perspectives, angles, or vantage points are presented depending on user control. The experience of the user can change depending on the perspective of the media stream presented. A device sensor, such as an accelerometer, compass, gyroscope, camera, etc., can be used to control which multi-dimensional bit streams are displayed to a particular user. Devices may include mobile devices, remote controls, tablets, etc. A user can pan around or move about a displayed scene or object in an intuitive and non-imposing manner.

Example Embodiments

Multi-dimensional media such as three dimensional (3D) television streams present a scene to a user from multiple perspectives, each perspective provided from a slightly different vantage point. In some examples, a 3D movie provides a distinct hit stream thr each eye of a particular user. The two different bit streams in a 3D movie may be visible with 3D glasses or glasses free mechanisms such as parallax-barrier and lenticular autostereoscopic displays. The different bit streams may be offset slightly or presented from slightly different perspectives or vantage points to provide a viewer with the illusion of depth.

According to various embodiments, it is contemplated that numerous bit streams corresponding to numerous different perspectives will be available to a user. Only a subset of those bit streams may be presented at any particular time. In some instances, a system may perform head or eye tracking so that corresponding perspectives are presented when a user physically moves around a display. In particular embodiments, if a view of a monument from the southwestern direction is being presented, a view of the monument from the southern direction may be provided instead if a user physically moves to his right. The view may include a pair of bit streams from a particular direction.

According to various embodiments, a user may control the perspective of media or which video and audio bit streams are presented by manipulating, rotating, or moving a device and an accelerometer associated with a device. The accelerometer may allow a change of perspective, panning, zooming, etc. Rotation of a device in a particular manner will change the vantage point front which a user views an object or scene. Accelerometer input data is provided to a bit stream receiver.

According to various embodiments, a content server receives one or more bit streams for a particular program. The multiple hit streams may illustrate different perspectives of a particular scene. In some examples, a single bit stream may be received at a content server and the content server may be responsible for generating bit streams for different perspectives. In still other examples, computer graphics content, files, images, etc., may be provided, to a content server that generates alternative vantage points for any particular scene. Different bit streams may be provided to a device such as a mobile device or tablet depending on device requests, subscription information, authorization level, device capability, etc. In some examples, a device may not be authorized to receive different vantage point bit streams.

In particular embodiments, different perspective bit streams may be combined into a single stream or derived from the single bit stream. In some examples, a content server generates multiple perspective bit streams. In particular embodiments, the different perspective bit streams may have different quality levels, e.g. different resolutions, bit rates, frame rates, audio encoding levels, etc. A particular device may be authorized to receive only particular perspective bit streams at particular quality levels.

FIG. 1 illustrates one example of a multi-dimensional media system. According to various embodiments, a scene 121 is captured by multiple cameras and recorders. In particular embodiments, the scene 121 may be a static object, moving entities, people, a landscape, a stage, etc. Stereoscopic video cameras, multichannel audio recorders, individual still cameras, etc., may capture the scene 121 from different perspectives, vantage points, or positions such as 101, 103, 105, 107, 109, 111, 113, 115, 117, 131, 133, 135, 137, 141, and 143. Some recorders may be placed to view the scene from a particular angle and/or location. In particular embodiments, scene 121 may be viewed from different angles corresponding to positions 101, 103, 105, 107, 109, 111, 113, 115, and 117. The camera or recording device at each location may store or transmit captured media.

When a device requests media corresponding to the scene 121, the device may receive a 3D or non-3D media stream from a default perspective such as perspective from position 109. The default perspective may include one or more bit streams. To change viewing perspectives, a user could manipulate a device so that the device detects angular motion using an accelerometer. In other examples, a compass included in the device may be used to determine orientation. Moving the device a particular way may switch the viewing perspective to a different perspective such as a perspective from position 111. A different motion could change the perspective to a perspective corresponding to location 131. A sensor such as a compass, accelerometer, gyroscope, camera, etc., can be used to detect changes in orientation, motion, rotation, velocity, acceleration, jerk, snap, etc.

Figure 2:
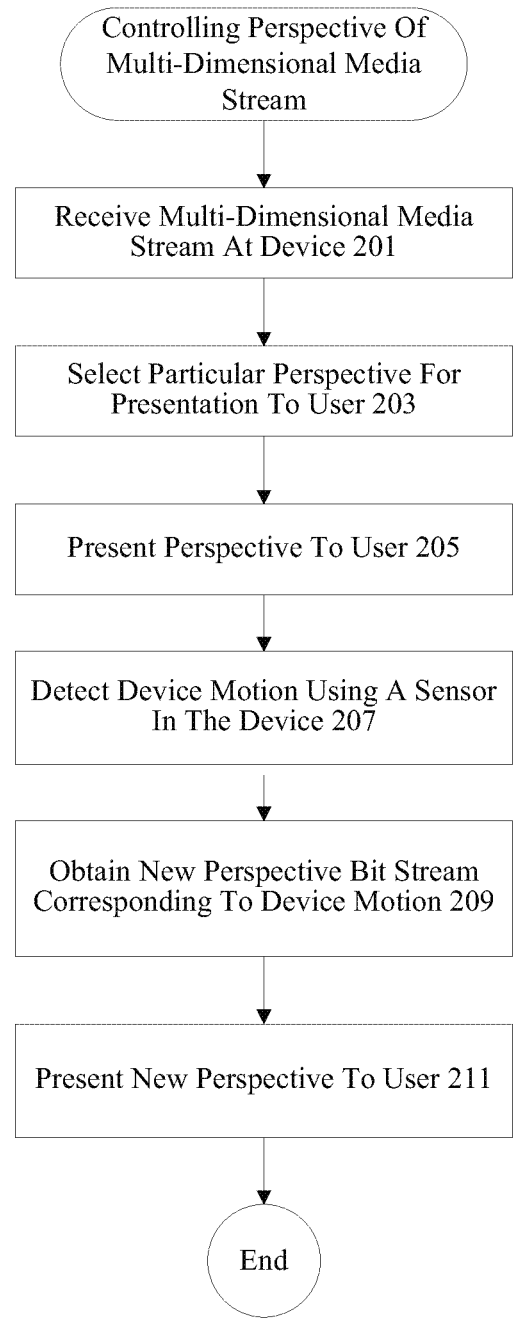
FIG. 2 illustrates one example of a technique for controlling the perspective of a multi-dimensional media stream that is displayed at a device.

FIG. 2 illustrates one example of a technique for controlling the perspective of a multi-dimensional media stream. According to various embodiments, a multi-dimensional media stream is received at a device such as a mobile device at 201. The multi-dimensional media stream may be single bit stream or multiple bit streams. A particular perspective may be selected for presentation to the user at 203. In particular embodiments, a perspective is presented to the user of the device 205. According to various embodiments, the perspective is a single default 3D perspective or a single default non-3D perspective included in the bit stream. The default perspective may be specified in the bit stream, by the user, or by the device. At 207, device motion is detected using a sensor included in the device. The sensor may be a compass, accelerometer, gyroscope, camera, etc., that detects changes in orientation, motion, rotation, velocity, acceleration, etc.

Motion in a particular manner may change the presented perspective to the user at 209. In particular embodiments, the device requests a different perspective bit stream from the content server. In other example, the device already has the different perspective bit stream and performs appropriate decoding to present the bit stream to the user. In some examples, the different perspective bit stream is embedded in the original media stream received from the content server. At 211, a scene recorded from the new perspective is presented to the user. The scene may include audio, video, as well as other recorded sensory experiences. In some examples, motion such as lateral movement, rotation about an access, acceleration, or motion combined with screen gestures or voice commands can be used to change perspectives.

Figure 3:
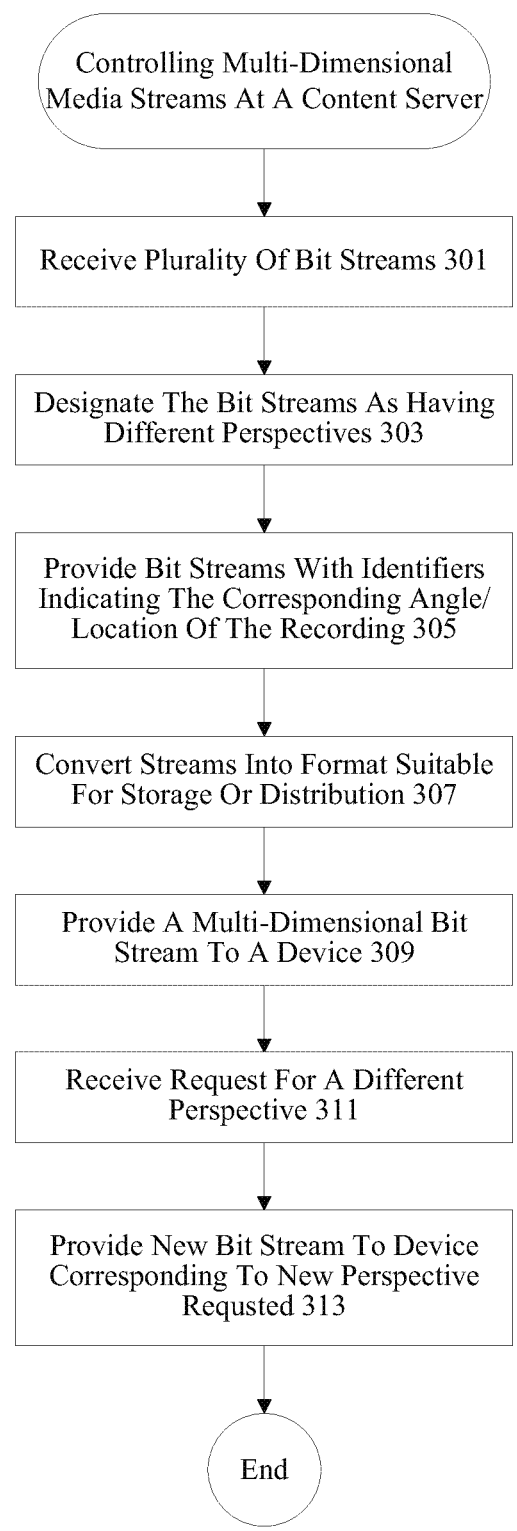
FIG. 3 illustrates one example of a technique for controlling multi-dimensional media streams at a content server.

FIG. 3 illustrates one example of a technique for controlling multi-dimensional media streams at a content server. According to various embodiments, a content server receives a plurality of bit streams that include recordings from different perspectives or different vantage points of the same scene at 301. The content server designates the bit streams as bit streams corresponding to different perspectives at 303. In particular embodiments, the bit streams may include audio and/or video. In some examples, each bit stream is provided with identifiers indicating a particular angle or location from which the scene was recorded at 305. At 307, the server performs encoding to convert the streams into a format suitable for storage or distribution. In some examples, the bit streams are combined into a single stream. In other examples, the bit streams are maintained as separate streams and provided to devices on an as-requested basis. In still other examples, some bit streams corresponding to particular perspectives are provided when a device requests a multi-dimensional bit stream. One or more bit streams may be provided, when the content server provides a multi-dimensional bit stream to the device at 309. At 311, a content server may receive a request for a bit stream that includes a recording from a different perspective, e.g. from a device detecting motion. At 313, the content server may provide the new bit stream with the requested perspective to the device. The content server may be a segment server, fragment server, file server, etc.

A variety of mechanisms are used to deliver media streams to devices. In particular embodiments, a server computer receives a connection for a media stream, establishes a session, and provides a media stream to a client device. The media stream includes packets encapsulating frames such as MPEG-4 frames. The MPEG-4 frames themselves may be key frames or differential frames. The specific encapsulation methodology used by the server depends on the type of content, the format of that content, the format of the payload, and the application and transmission protocols being used to send the data. After the client device receives the media stream, the client device decapsulates the packets to obtain the MPEG frames and decodes the MPEG frames to obtain the actual media data.

According to various embodiments, the fragment server uses a REST API that is cache-friendly so that most requests made to the fragment server can be cached. The fragment server uses cache control headers and ETag headers to provide the proper hints to caches. This API also provides the ability to understand where a particular user stopped playing and to start play from that point (providing the capability for pause on one device and resume on another).

According to various embodiments, the client includes an application logic component and a media rendering component. The application logic component presents the UI for the user and also communicates to the front-end server to get shows that are available for the user and authenticates communications. As part of this process, the server returns URLs for media assets that are passed to the media rendering component.

In particular embodiments, the client relies on the fact that each fragment in a fragmented MPEG-4 file has a sequence number. Using this knowledge and a well-defined URL structure for communicating with the server, the client requests fragments individually as if it was reading separate files from the server simply by requesting URLs for files associated with increasing sequence numbers. In some embodiments, the client can request files corresponding to higher or lower bit rate streams depending on device and network resources.

Since each fragment contains the information needed to create the URL for the next file, no special playlist files are needed, and all actions (startup, channel change, seeking) can be performed with a single HTTP request. After each fragment is downloaded the client assesses among other things the size of the fragment and the time needed to download it in order to determine if downshifting is needed, or if there is enough bandwidth available to request a higher bit rate.

Because each request to the server looks like a request to a separate file, the response to requests can be cached in any HTTP Proxy, or be distributed over any HTTP based CDN.

Figure 4:
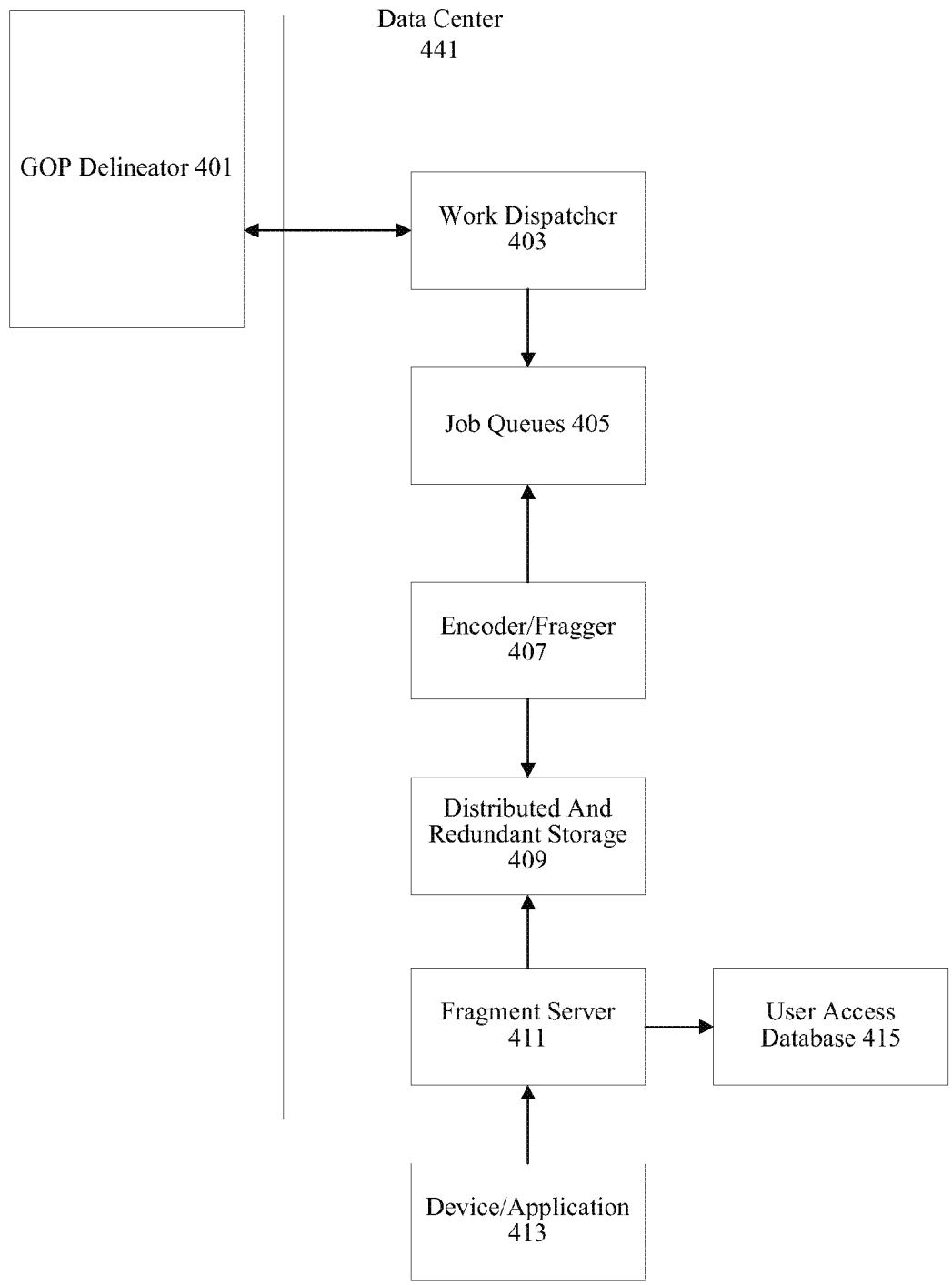
FIG. 4 illustrates one example of a content server system.

FIG. 4 illustrates one example of a content server for sending multi-dimensional bit streams. It should be noted that FIG. 4 illustrates one particular example of a content server using a fragmented media stream delivery system. A variety of media stream delivery systems that may or may not involve fragmentation can be used. According to various embodiments, a media stream is received from a content provider source such as a satellite. In particular embodiments, the media stream is provided in an MPEG-2 format. The media stream is delineated into Groups of Pictures (GOPs) using a GOP delineator 401. The GOP is a group of pictures in coded media and typically includes key and predictive frames. A key frame may be an I-frame or intra-coded frame that represents a fixed image that is independent of other pictures. According to various embodiments, each GOP begins with an I-frame. Predictive frames such as P-frames or predictive-coded frames and B-frames or bi-directionally predictive coded frames contain different information indicating distinctions from a reference frame such as a key frame or another predictive frame.

After the media stream is delineated into GOPs, a work dispatcher 403 is notified that a GOP is available. According to various embodiments, the work dispatcher 403 determines if it is the one assigned to work on it as well as what should be done with the GOP. According to various embodiments, the work dispatcher may determine that the GOP should be encoded into 8 different variants. Furthermore, each of the 8 different variants may have 4 different watermark variants generated. In particular embodiments, the work dispatcher 403 creates a description of what needs to be done, assigns a weight or priority level to the job, and sends the job to job queues 405. According to various embodiments, job queues are first in first out (FIFO) queues that are empty most of the time. Encoders/fraggers 407 request jobs and obtain them from the job queues 405. According to various embodiments, jobs may be ordered in a job queue based on weight. In particular embodiments, encoders/fraggers 407 may select higher priority jobs first from the job queues.

In particular embodiments, different priority jobs are placed in different priority job queues. Multiple jobs may be taken from the higher priority job queues before a single job is taken from the lower priority job queues. According to various embodiments, highest priority jobs are processed before lower priority jobs. In particular embodiments, queues are assigned percentage of service values. A high priority queue may get serviced 40% of the time. A medium priority queue 30% of the time, and the remaining queues 20% and 10% of the time by the encoders/fraggers. According to various embodiments, hundreds or thousands of encoders/fraggers reside in a system. In particular embodiments, the same device performs both encoding and fragmentation, but it should be noted that separated devices can be used to perform these operations. According to various embodiments, additional encoder/fraggers can be dynamically brought online when resource usage reaches a particular threshold. Alternatively, encoder/fraggers can be taken offline when resources usage falls beneath a particular floor. According to various embodiments, encoder/fragger 407 is a virtual machine that may reside on one or more physical servers that may or may not have specialized encoding hardware. In particular embodiments, a cloud service determines how many of these virtual machines to use based on established thresholds.

According to various embodiments, a unique identifier is provided for each GOP and a of each step is maintained. After the encoder/fragger 407 completes processing a job and outputs an encoded fragment, the encoded fragment is maintained in distributed and redundant storage 409. In one example, distributed and redundant storage 409 is a virtualized scale out network attached storage system. The distributed and redundant storage 409 allows a system to maintain numerous fragments on any number of virtualized storage devices.

According to various embodiments, fragments on distributed and redundant storage 409 are accessible by fragment server 411. The fragment server 411 provides the caching layer with fragments for clients. The design philosophy behind the client/server API minimizes round trips and reduces complexity as much as possible when it comes to delivery of the media data to a client device. The fragment server 411 provides live streams and/or DVR configurations.

Figure 5:
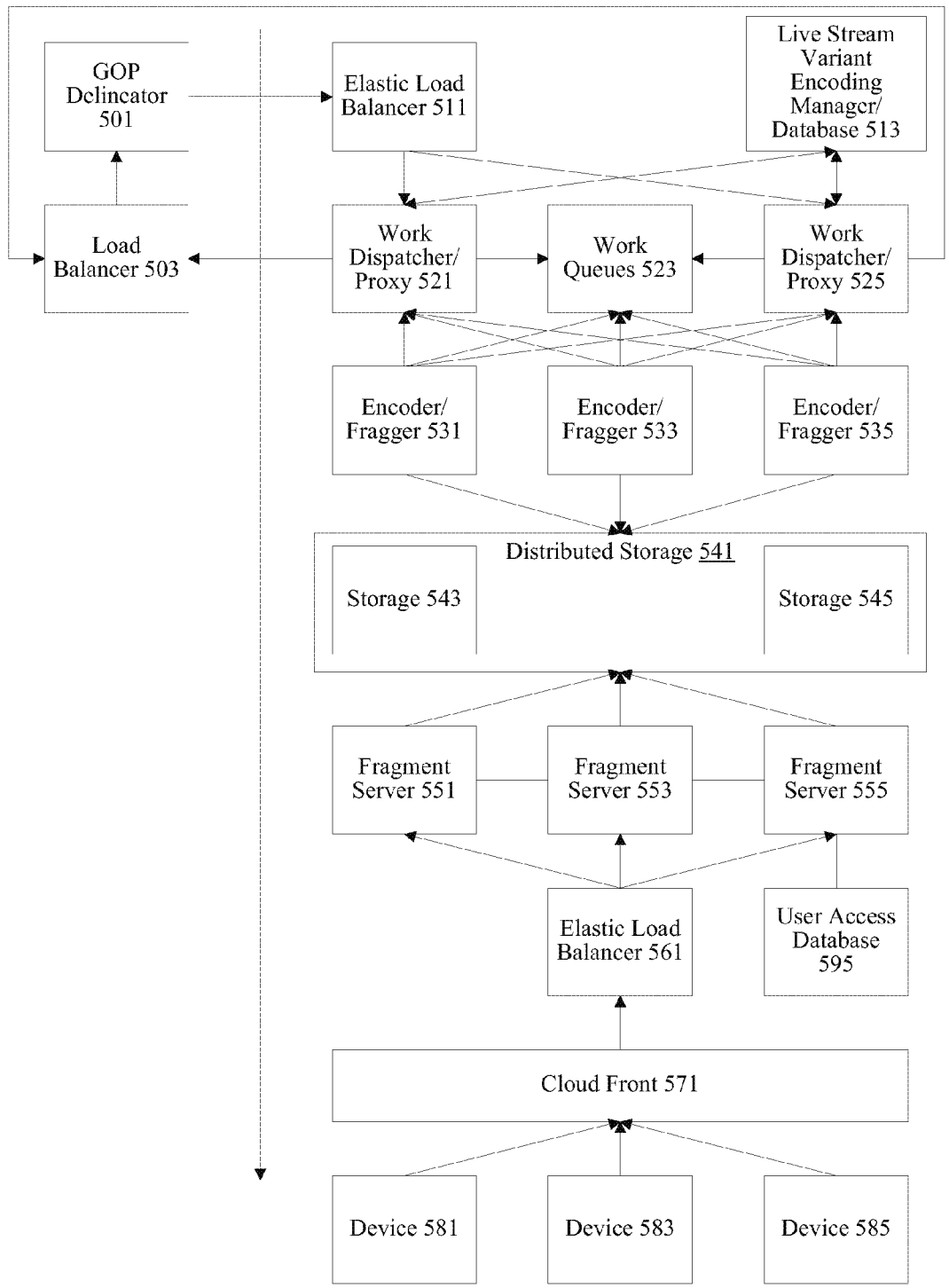
FIG. 5 illustrates another example of a content server system.

FIG. 5 illustrates one example of a distributed, scalable encoding system that can be used to provide different watermark variants. According to various embodiments, a media stream is received from a content provider source such as a satellite. In particular embodiments, the media stream is provided in an MPEG-2 format. The media stream is delineated into Groups of Pictures (GOPs) using a GOP delineator 501. The GOP is a group of pictures in coded media and typically includes key and predictive frames. A key frame may be an I-frame or intra-coded frame that represents a fixed image that is independent of other pictures. According to various embodiments, each GOP begins with an I-frame. Predictive frames such as P-frames or predictive-coded frames and B-frames or bi-directionally predictive coded frames contain different information indicating distinctions from a reference frame such as a key frame or another predictive frame. According to various embodiments, multiple GOP delineators 501 are active simultaneously. If a GOP delineator fails, other GOP delineators are available and all GOP delineators can send out notifications.

After the media stream is delineated into GOPs, an elastic load balancer 511 is used to distribute work to work dispatchers 521 and 525. According to various embodiments, a live stream variant encoding manager 513 monitors live stream variant consumption. If particular variants are not being consumed, jobs for creating those variants are no longer performed. If particular not yet available variants are requested, then jobs creating those variants can be generated by the work dispatcher 525 at the request of the live stream variant encoding manager 513. If a work dispatcher fails right as it takes a notification, another notification occurs to a different work dispatcher. Two notifications for the same GOP will end up on two different machines. At each work dispatcher 521 and 525, there may also be a proxy. According to various embodiments, the GOP delineator 501 resides on a different data center than the work dispatchers 521 and 525. Using proxies at work dispatchers 521 and 525 allows for a single transfer of a media stream GOP between data centers.

According to various embodiments, the work dispatchers 521 and 525 determine characteristics of a particular job and what should be done with the GOP. According to various embodiments, the work dispatchers 521 and 525 may determine that the GOP should be encoded into 8 different variants. In particular embodiments, the work dispatchers 521 and 525 create descriptions of what needs to be done and send jobs to job queues 523. According to various embodiments, job queues 523 include an active job queue and a standby job queue. According to various embodiments, job queues are first in first out (FIFO) queues that are empty most of the time. Timeouts may be associated with each job in the queue. Encoders/fraggers 531, 533, and 535 request jobs and obtain them from the job queues 523. In particular embodiments, encoders/fraggers 531, 533, and 535 are identical and can be dynamically activated or deactivated. According to various embodiments, hundreds or thousands of encoders/fraggers reside in a system.

In particular embodiments, the same device performs both encoding and fragmentation, but it should be noted that separate devices can be used to perform these operations. According to various embodiments, additional encoder/fraggers can be dynamically brought online when resource usage reaches a particular threshold. Alternatively, encoder/fraggers can be taken offline when resources usage falls beneath a particular floor. According to various embodiments, encoder/fragger 531, 533, and 535 is a virtual machine that may reside on one or more physical servers that may or may not have specialized encoding hardware. In particular embodiments, a cloud service determines how many of these virtual machines to use based on established thresholds.

According to various embodiments, encoders/fraggers 531, 533, and 535 are stateless. According to various embodiments, a unique identifier is provided for each GOP and a of each step is maintained. If a particular encoder/fragger fails at any point in the process, another encoder/fragger can perform encoding and fragmentation operations. After the encoders/fraggers 531, 533, and 535 complete the jobs and generate encoded fragments, the encoded fragments are maintained in distributed and redundant storage 541. In one example, distributed and redundant storage 541 is a virtualized scale out network attached storage system. The distributed and redundant storage 541 includes nodes 543 and 545, allowing a system to maintain numerous fragments on any number of virtualized storage devices.

According to various embodiments, fragments on distributed and redundant storage 541 are accessible by fragment servers 551, 553, and 555. The fragment servers 551, 553, and 555 provide a caching layer with fragments for clients. The design philosophy behind the client/server API minimizes round trips and reduces complexity as much as possible when it comes to delivery of the media data to a client device. The fragment servers 551, 553, and 555 provide live streams and/or DVR configurations. According to various embodiments, fragment servers also operate without state. In particular embodiments, fragments servers operate using HTTP get requests. According to various embodiments, each process allows a flow to continue without having a centralized control point. An elastic load balancer 561 distributes fragment requests from a cloud front 571 provided to devices 581, 583, and 585. According to various embodiments, devices 581, 583, and 585 monitor and analyze media streams to determine what fragments should be cached. In some examples, devices 581, 583, and 585 cache any fragment that has been determined to be redundant to any fragment previously requested. Fragments can be compared using identifiers, hashes, etc.

According to various embodiments, a client device uses a media component that requests fragmented MPEG-4 files, allows trick-play, and manages bandwidth adaptation. In particular embodiments, bandwidth adaptation information, playlist information, and media data is included in a box structure generated by encoder/fraggers 531, 533, and 535. In particular embodiments, a device/application 581, 583, and/or 585 perform a transport control protocol 3-way handshake with fragment servers 551, 553, and/or 555 to initiate a connection to receive a media stream. According to various embodiments, instead of the device/application 581, 583, or 585 requesting bandwidth adaptation information, playlist information, and media data in separate transactions from the fragment servers 551, 553, and/or 555 the bandwidth adaptation information, playlist information, and media data may be embedded in a box structure provided with the media stream fragments by the fragment server. In some examples, the box structure may be provided with first fragment.

Figure 6:
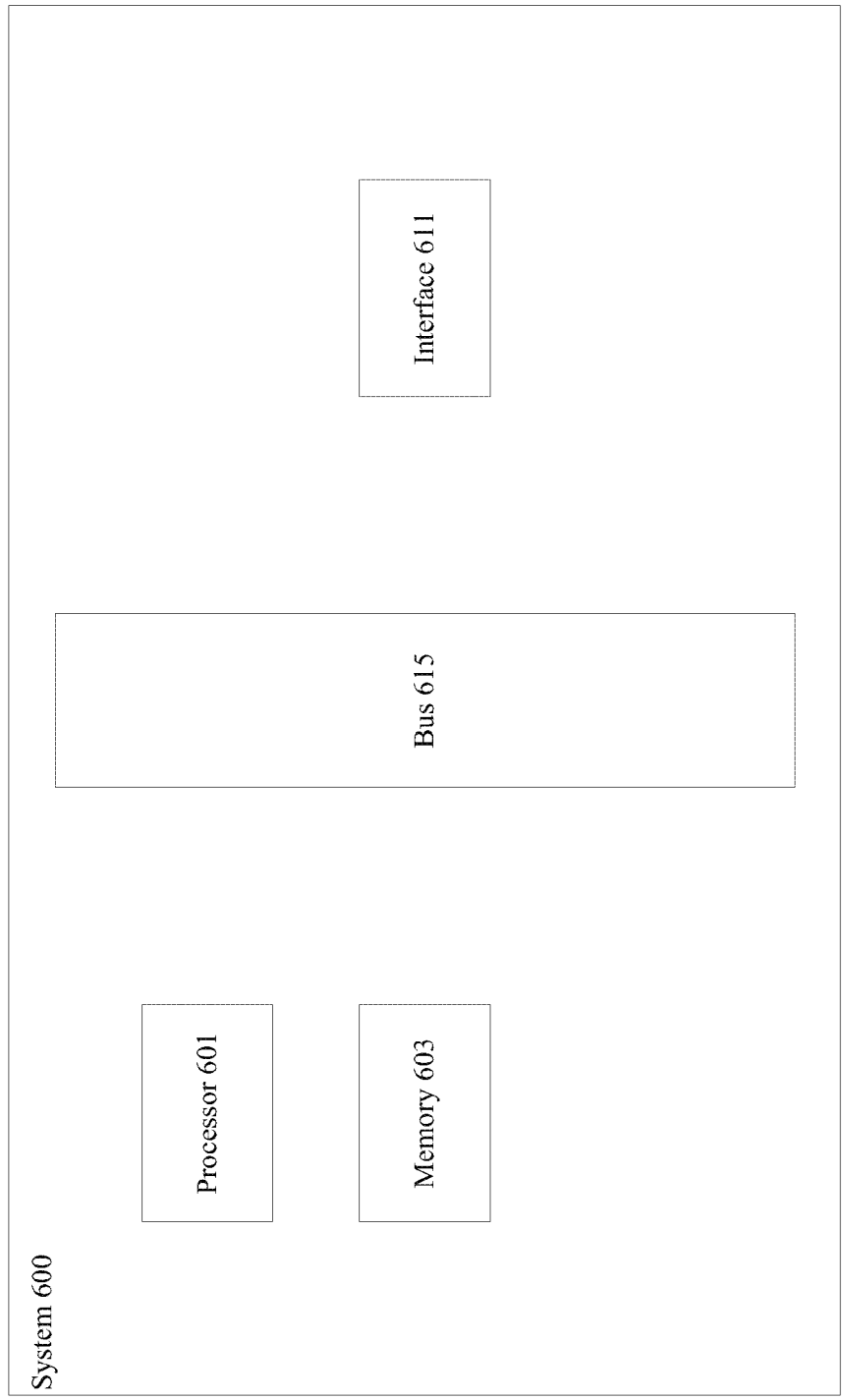
FIG. 6 illustrates one example of a computer system.

FIG. 6 illustrates one example of a computer system. According to particular embodiments, a system 600 suitable for implementing particular embodiments of the present invention includes a processor 601, a memory 603, an interface 611, and a bus 615 (e.g., a PCI bus or other interconnection fabric) and operates as a streaming server. When acting under the control of appropriate software or firmware, the processor 601 is responsible for modifying and transmitting live media data to a client. Various specially configured devices can also be used in place of a processor 601 or in addition to processor 601. The interface 611 is typically configured to send and receive data packets or data fragments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 600 is a fragment server that also includes a transceiver, streaming buffers, and a program guide database. The fragment server may also be associated with subscription management, logging and report generation, and monitoring capabilities in particular embodiments, the fragment server includes functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the fragment server handles requests and responses for media content-related transactions while a separate streaming server provides the actual media streams.

Although a particular fragment server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
receiving a three-dimensional (3D) media stream from a content server for display at a device, wherein the device is a hand-held mobile device;
presenting at the device a first perspective corresponding to the 3D media stream to a user of the device, wherein the first perspective includes a first view of a scene from a first vantage point;
detecting device motion at the device using a sensor included in the device, wherein the device motion changes the perspective of the user in relation to the display;
presenting at the device a second perspective corresponding to the 3D media stream to the user of the device, wherein the second perspective includes a second view of the scene from a second vantage point, wherein presenting the first and second perspectives includes providing a distinct bit stream to each eye of the user resulting in a stereoscopic display to the user.

2. The method of claim 1, wherein the 3D media stream includes a plurality of bit streams corresponding to a plurality of different perspectives, wherein each of the plurality of different perspectives includes a different view of the scene from a different vantage point.

3. The method of claim 2, wherein the different vantage point is a view from a different angle.

4. The method of claim 2, wherein the different vantage point is a view from a different location.

5. The method of claim 2, wherein different media streams corresponding to different perspectives are transmitted from the content server to the device depending on accelerometer based input from the device.

6. The method of claim 1, wherein the content server is a fragment server.

7. The method of claim 2, wherein the plurality of bit streams are combined into a single media stream.

8. The method of claim 2, wherein the plurality of bit streams is transmitted as separate media streams.

9. The method of claim 1, wherein the sensor is an accelerometer.

10. The method of claim 1, wherein the sensor is a gyroscope.

11. A device comprising:
an interface operable to receive a three-dimensional (3D) media stream from a content server for display at a device, wherein the device is a hand-held mobile device;
a display operable to present a first perspective at the device corresponding to the 3D media stream to a user of the device, wherein the first perspective includes a first view of a scene from a first vantage point;
a sensor operable to detect motion in the device, wherein the motion changes the perspective of the user in relation to the display;
wherein a second perspective corresponding to the 3D media stream is presented at the device to the user of the device, wherein the second perspective includes a second view of the scene from a second vantage point, wherein presenting the first and second perspectives includes providing a distinct bit stream to each eye of the user resulting in a stereoscopic display to the user.

12. The device of claim 11, wherein the 3D media stream includes a plurality of bit streams corresponding to a plurality of different perspectives, wherein each of the plurality of different perspectives includes a different view of the scene from a different vantage point.

13. The device of claim 12, wherein the different vantage point is a view from a different angle.

14. The device of claim 12, wherein the different vantage point is a view from a different location.

15. The device of claim 12, wherein different media streams corresponding to different perspectives are transmitted from the content server to the device depending on accelerometer based input from the device.

16. The device of claim 11, wherein the content server is a fragment server.

17. The device of claim 12, wherein the plurality of bit streams are combined into a single media stream.

18. The device of claim 12, wherein the plurality of bit streams is transmitted as separate media streams.

19. The device of claim 11, wherein the sensor is an accelerometer.

20. A non-transitory computer readable medium comprising:
computer code for receiving a three-dimensional (3D) media stream from a content server for display at a device, wherein the device is a hand-held mobile device;
computer code for presenting at the device a first perspective corresponding to the 3D media stream to a user of the device, wherein the first perspective includes a first view of a scene from a first vantage point;
computer code for detecting device motion at the device using a sensor included in the device, wherein the device motion changes the perspective of the user in relation to the display;
computer code for presenting at the device a second perspective corresponding to the 3D media stream to the user of the device, wherein the second perspective includes a second view of the scene from a second vantage point, wherein presenting the first and second perspectives includes providing a distinct bit stream to each eye of the user resulting in a stereoscopic display to the user.

* * * * *